Dec. 21, 1965   C. J. STALEGO   3,224,852
APPARATUS FOR FORMING FIBERS
Original Filed Dec. 28, 1956   6 Sheets-Sheet 1
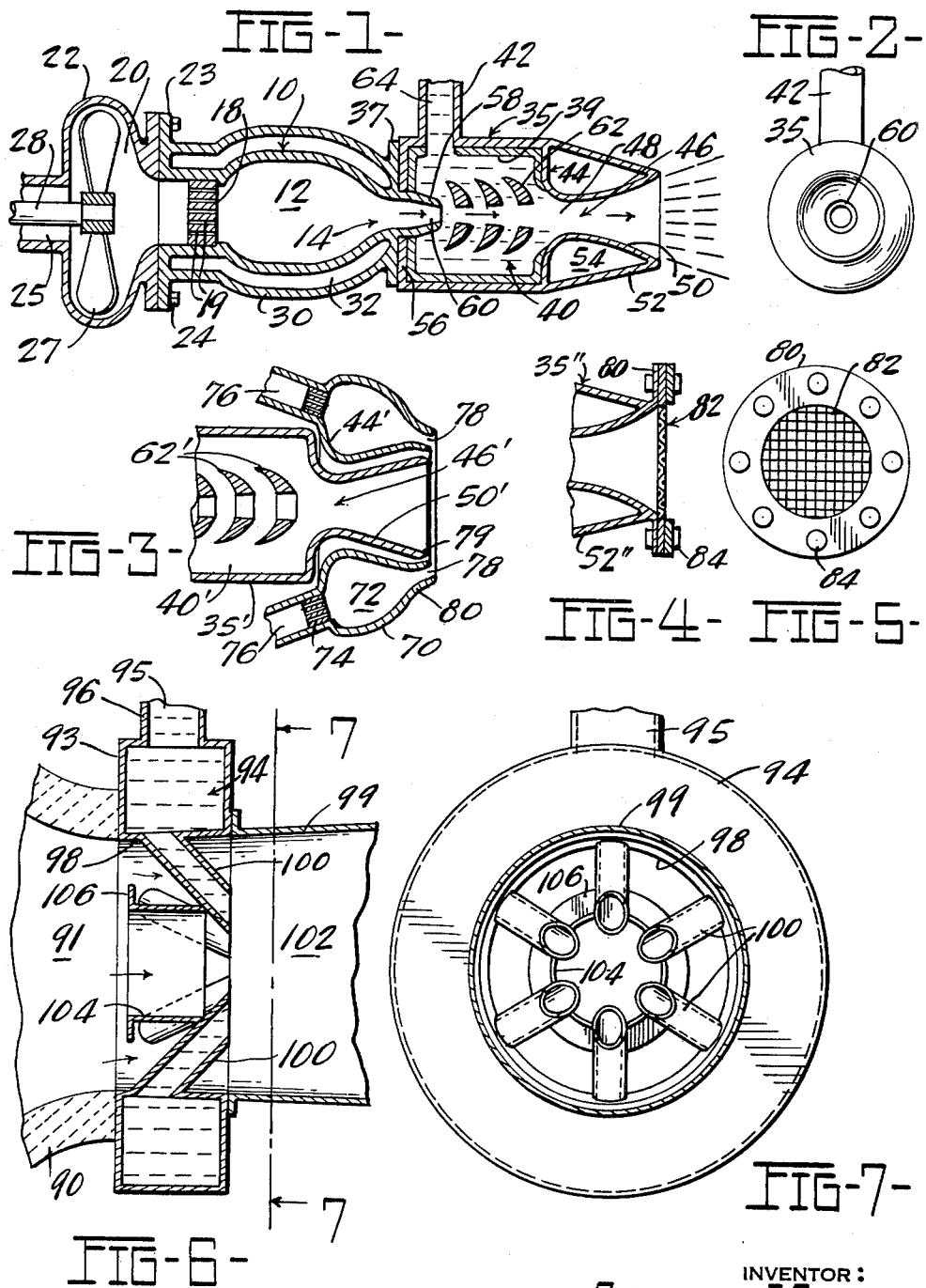
INVENTOR:
CHARLES J. STALEGO.
BY
ATTORNEYS.

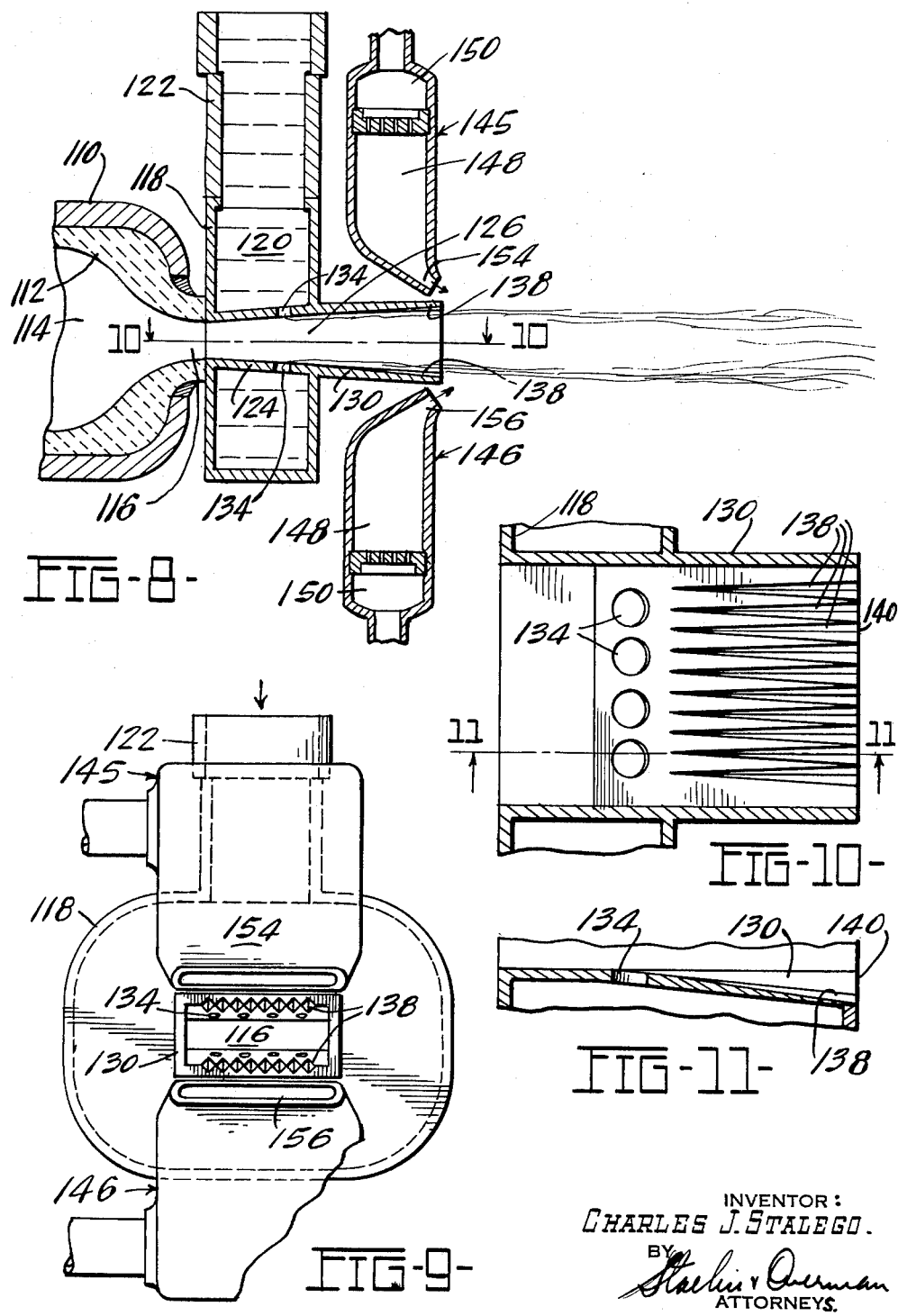

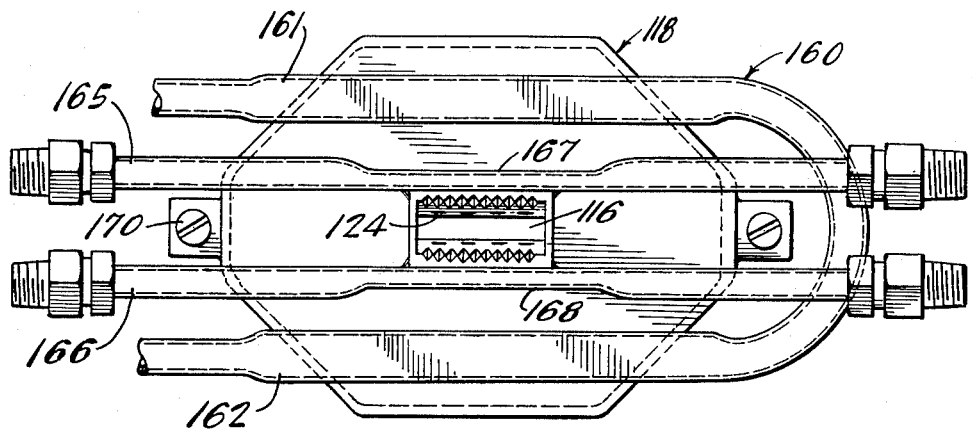
FIG-12-
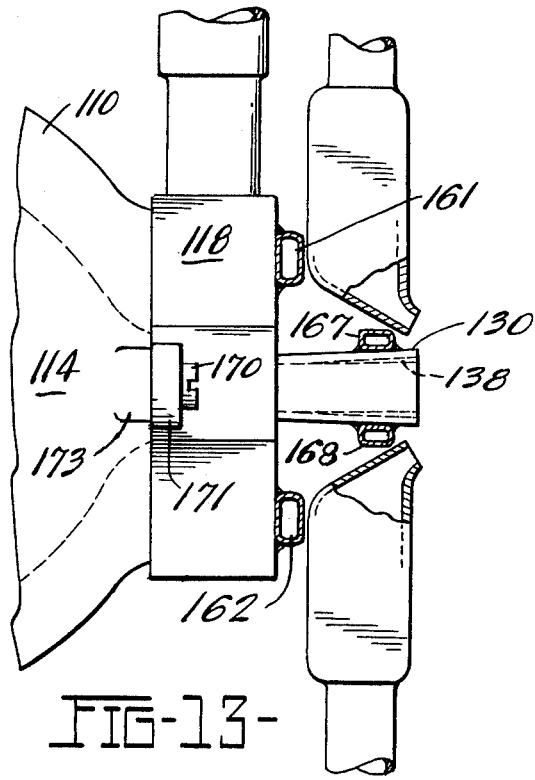
FIG-13-

Dec. 21, 1965   C. J. STALEGO   3,224,852
APPARATUS FOR FORMING FIBERS
Original Filed Dec. 28, 1956   6 Sheets-Sheet 4
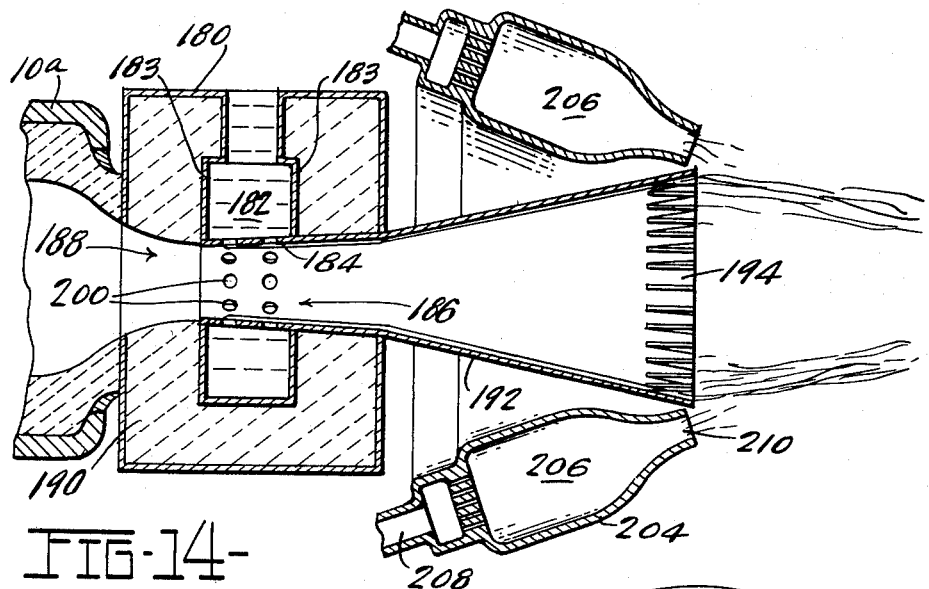
FIG-14-
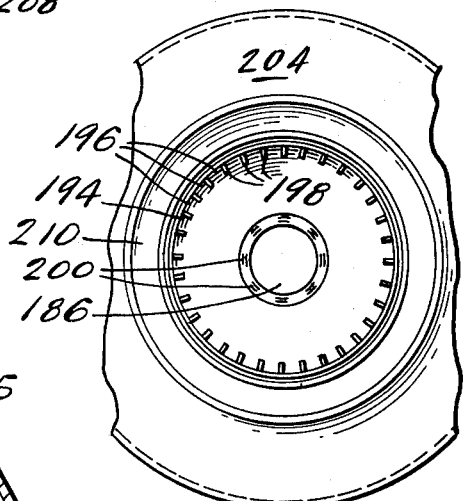
FIG-15-
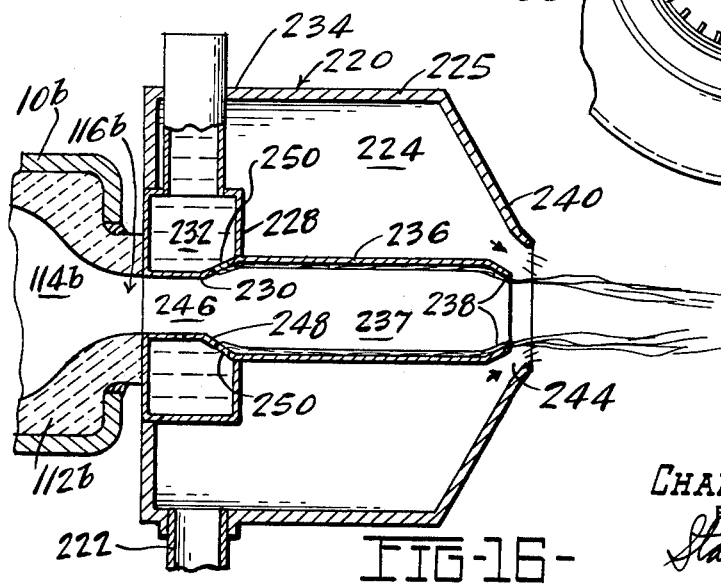
FIG-16-
INVENTOR:
CHARLES J. STALEGO.
BY
ATTORNEYS.

Dec. 21, 1965
C. J. STALEGO
3,224,852
APPARATUS FOR FORMING FIBERS
Original Filed Dec. 28, 1956
6 Sheets-Sheet 5
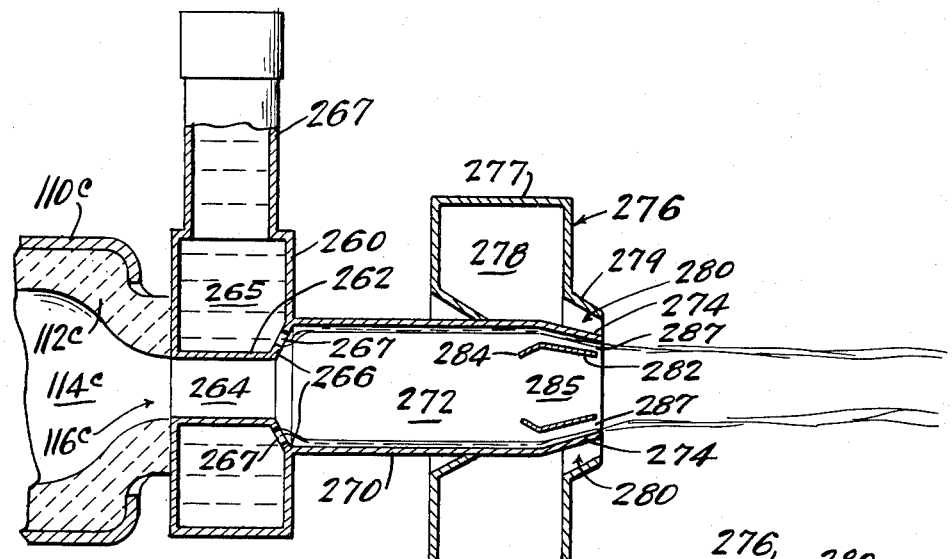
FIG-17-
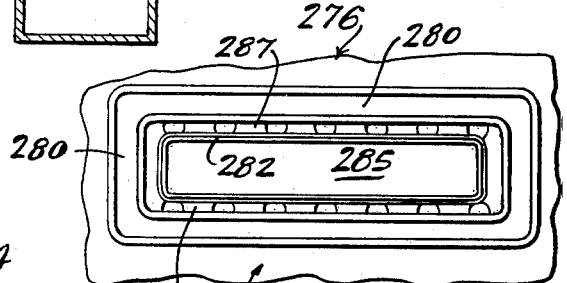
FIG-18-
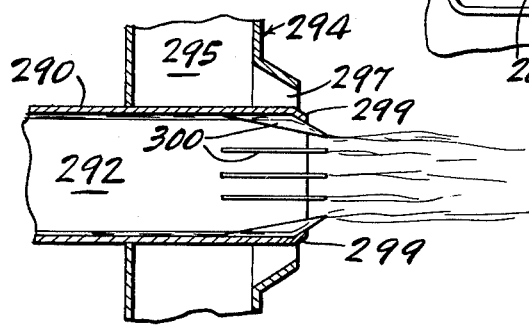
FIG-19-
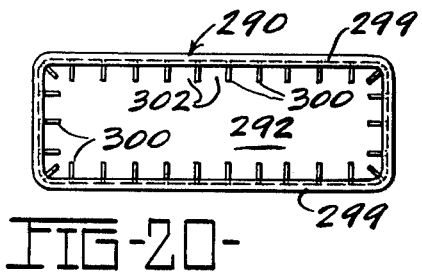
FIG-20-
INVENTOR:
CHARLES J. STALEGO.
BY
ATTORNEY Dec. 21, 1965  C. J. STALEGO  3,224,852
APPARATUS FOR FORMING FIBERS
Original Filed Dec. 28, 1956  6 Sheets-Sheet 6
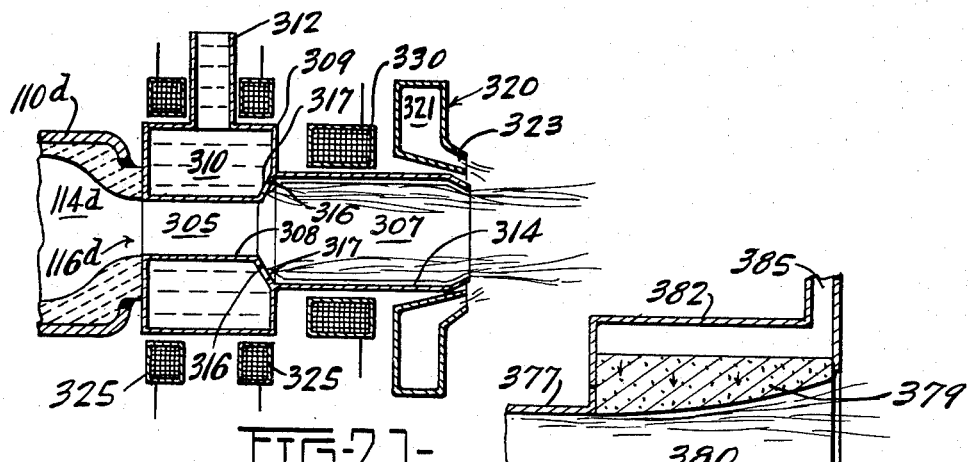
FIG-21-
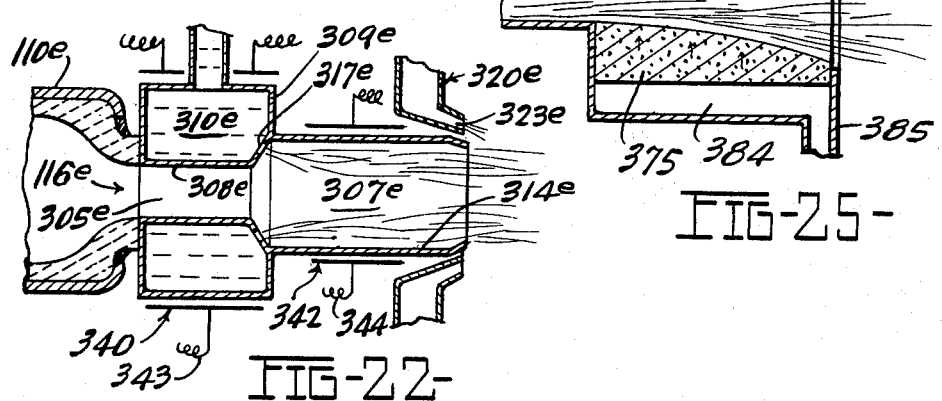
FIG-22-  FIG-25-
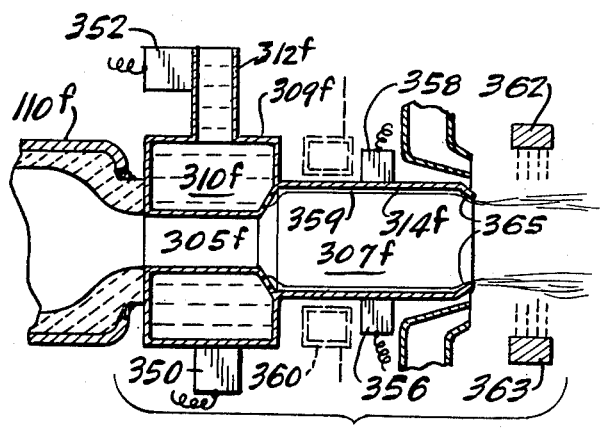
FIG-23-
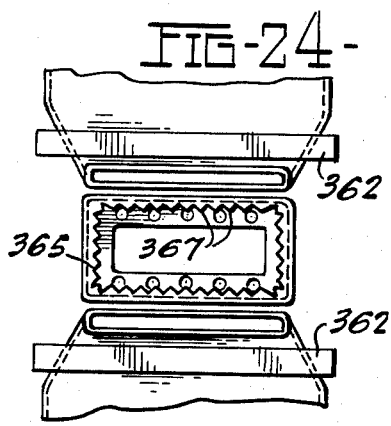
FIG-24-
INVENTOR:
CHARLES J. STALEGO.
BY
ATTORNEYS.

United States Patent Office 3,224,852
Patented Dec. 21, 1965

3,224,852
APPARATUS FOR FORMING FIBERS
Charles J. Stalego, Newark, Ohio, assignor to Owens-Corning Fiberglas Corporation, a corporation of Delaware
Original application Dec. 28, 1956, Ser. No. 631,218, now Patent No. 3,015,127, dated Jan. 2, 1962. Divided and this application Dec. 28, 1961, Ser. No. 162,871
4 Claims. (Cl. 65—16)

This application is a division of my copending application Serial No. 631,218, filed December 28, 1956, and now Patent No. 3,015,127.

This invention relates to a method and apparatus for forming or producing fibers from thermoplastic or heat-softenable fiber-forming materials, the invention relating more especially to the formation of fibers from mineral materials such as glass, fusible rock or slag.

It has been commercial practice to form comparatively fine fibers from material such as glass by feeding preformed filaments or rods of glass or other heat-softenable material into a high velocity blast of gases of a temperature sufficient to soften the ends of the rods or filaments and the softened material drawn or attenuated to fibers by the velocity of the gases of the blast. This method involves flowing streams of molten glass from a supply and drawing the streams, while they are being cooled by the surrounding atmosphere, into primary filaments or rods. The solidified rods or primary filaments are delivered or advanced endwise into the blast of hot gases and, being substantially rigid, are adapted to penetrate the layer of induced air at the boundary of the gases of the blast and enter the intensely hot core of the blast.

Endeavors have been directed to methods for projecting or delivering a molten stream of glass directly into a gaseous blast without the preliminary step of solidifying the material in order to avoid reheating the material to promote attenuation. Difficulties have been encountered in projecting the stream into the hot gases of the blast because of the tendency for the induced air stream at the boundary of the blast to carry the softened glass along the blast whereby it is prevented from being delivered into the hot gases.

The air stream chills the material of the stream and hence there is little or no attenuation or formation of fibers. It is desirable to effect the delivery of molten glass directly into the hot gases in order to avoid reheating the chilled glass by the blast as this results in a considerable heat loss and reduced fiber production.

The present invention embraces a method for delivering molten glass or other heat-softenable fiber-forming material into an intensely hot region of a gas stream as by inspiration whereby the molten glass is entrained in the gases of the blast and drawn or attenuated into fibers by the blast velocity.

Another object of the invention is the provision of a method of delivering molten or flowable fiber-forming material into a region wherein the molten or flowable material is engaged by moving gases of a blast within a confined zone whereby the velocity of the gases converts the material into discrete bodies or fibers.

Another object of the invention is the provision of a method and apparatus for inspirating glass or other heat-softenable material directly into a gas stream while in a confined region and in advance of the establishment by the moving gases of induced air flow.

Another object of the invention resides in delivering heat-softened material into intimate contact with the gases of a high velocity gas stream moving through a walled or confined region fashioned or equipped with means for channeling the moving molten material into streams which may be readily attenuated by the moving gases to linear formations or fibers.

Another object of the invention is the provision of a method and apparatus for delivering molten or heat-softened mineral material into engagement with a moving gas stream in a manner whereby the material is entrained and conveyed by the gas stream and formed into discrete bodies by the forces of the gas stream, and supplementing the gas stream with additional moving gases which augment the forces operative to convert the material into discrete bodies.

Another object of the invention is the provision of a method and apparatus for delivering molten mineral material into intimate contact with the gases of a moving gas stream whereby the forces of the gas stream attenuate or convert the material to finely divided form and wherein the mineral material is maintained at a proper viscosity through the application of heat effective at the region of engagement of the moving gases with the material.

Another object resides in a method of forming fibers from heat-softenable materials by attenuation embracing the step of reducing surface tension of the material in the attenuating region facilitating the production of long fine fibers.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a longitudinal sectional semi-diagrammatic view illustrating one form of novel apparatus for carrying out the method of the invention;

FIGURE 2 is an end elevational view of an arrangement shown in FIGURE 1;

FIGURE 3 is a fragmentary sectional view of a portion of the arrangement shown in FIGURE 1 with auxiliary means augmenting the main attenuating blast with supplementary gas streams;

FIGURE 4 is a fragmentary detail sectional view illustrating a means fostering the subdivision and conversion of the molten material into discrete bodies.

FIGURE 5 is a front elevational view of the construction shown in FIGURE 4;

FIGURE 6 is a fragmentary longitudinal sectional view illustrating a modified arrangement for delivering molten material into a moving stream of confined gases;

FIGURE 7 is a transverse sectional view taken substantially on the line 7—7 of FIGURE 6;

FIGURE 8 is a longitudinal vertical sectional view illustrating another form of apparatus for carrying out the method of delivering heat-softened material into a high velocity gas stream for disintegrating or converting the material to finely divided form;

FIGURE 9 is a front elevational view of the arrangement shown in FIGURE 8;

FIGURE 10 is an enlarged longitudinal sectional view taken substantially on the line 10—10 of FIGURE 8;

FIGURE 11 is a detail sectional view taken substantially on the line 11—11 of FIGURE 10;

FIGURE 12 is a front elevational view of the arrangement shown in FIGURE 8 with the supplemental or auxiliary burners removed;

FIGURE 13 is a side elevational view of the arrangement shown in FIGURE 9;

FIGURE 14 is a longitudinal sectional view showing a modified form of apparatus for carrying out the method of the invention;

FIGURE 15 is a front elevational view of the arrangement shown in FIGURE 14;

FIGURE 16 is a longitudinal sectional view illustrating another form of apparatus for carrying out the method of the invention;

FIGURE 17 is a longitudinal sectional view illustrating another form of apparatus of the invention;

FIGURE 18 is a front elevational view of a portion of the construction shown in FIGURE 17;

FIGURE 19 is a sectional view of a blast confining means embodying an arrangement facilitating the delivery of flowable material into intimate engagement with the gases of a blast;

FIGURE 20 is a front elevational view of a portion of the arrangement shown in FIGURE 19;

FIGURE 21 is a longitudinal sectional view of an apparatus of the invention which is inclusive of induction heating means for conditioning and controlling the viscosity of the material delivered into a blast;

FIGURE 22 is a longitudinal sectional view similar to FIGURE 21 illustrating another form of heating means for controlling the viscosity of the material delivered into the gaseous blast;

FIGURE 23 is a view similar to FIGURE 21 illustrating the application of electrical heating means for conditioning the molten material prior to and concomitantly with the delivery of the molten material into the gaseous blast;

FIGURE 24 is a front elevational view of the arrangement shown in FIGURE 23, and FIGURE 25 is a fragmentary longitudinal sectional view of a blast discharge nozzle or blowing member illustrating an arrangement for avoiding the accumulation of molten material on the walls of the nozzle.

The apparatus and method of the invention are especially adapted for converting or subdividing molten mineral material, as, for example molten glass, slag or fusible rock into finely divided form such as fine fibers through the use of a gaseous attenuating blast or moving glass streams, and it is to be understood that the principles of the invention may be employed for other purposes utilizing other heat-softenable materials wherever the method and apparatus may be found to have utility.

Referring to the drawings in detail, and first with reference to the arrangement disclosed in FIGURES 1 and 2 there is illustrated a casing or member 10 shaped to provide a chamber or confined zone or region 12 in which gases may be maintained under pressure. A wall of the chamber 12 is formed with a restricted orifice or opening 14 through which gases from the chamber 12 are projected as a gaseous blast.

In the arrangement as disclosed, it is preferable to utilize gases at relatively high temperatures for producing the blast, but it is to be understood that the invention embraces the use of gases such as compressed air, superheated stream or the like forming a high velocity blast for converting molten material into discrete bodies such as filaments or fibers or bodies of other configurations or shapes.

In the embodiment illustrated in FIGURE 1, the chamber 12 may be an internal combustion chamber or confined zone wherein a mixture of fuel gas and air may be burned and the exhaust gases or products of combustion projected through the restricted opening 14 forming the blast. The walls of the combustion chamber 10 may be formed of or lined with refractory to resist the high temperatures developed in the chamber 12 which temperatures may be upwards of 3000° F. or more. The rear of the chamber is defined by a member or wall 18 formed with a plurality of comparatively small passages or openings 19 for establishing communication between the chamber 12 and a manifold chamber 20.

The manifold 20 is formed in a casing 22 secured to a flange 23 on the burner casing 10 by bolts 24. The manifold 20 may be supplied with a combustible mixture such as fuel gas and air through a tubular supply member 25 connected with the casing 22. The combustible mixture in the chamber 20 is under pressure and flows through the passages 19 into the chamber 12 where it is ignited and substantially completely burned, the perforated wall 18 forming a fire screen to prevent preignition of the mixture in the manifold 20.

While the mixture may be under an initial predetermined pressure, a pumping means 27 may be disposed in or associated with the manifold 20 in order to control or increase the pressure of the mixture to be delivered into the combustion chamber 12. The impeller of the pumping means may be supported upon a shaft 28 and driven by a motor or other suitable means (not shown).

The walls of the combustion chamber 12 are preferably surrounded by a jacket or housing 30 providing a passage or chamber 32 through which a coolant such as water or other fluid may be circulated in order to prevent overheating of the casing 10.

Disposed forwardly of the burner 10 is a housing, casing or member 35 which, in the embodiment illustrated is of circular configuration in cross section but may be of any shape suitable for cooperation with the combustion burner or blast producing means. The housing or casing 35 is secured to a flange 37 formed on the burner casing. The casing 35 may be made of metal suitable to withstand high temperatures or may be lined with high temperature resistant refractory 39. The casing 35 defines a confined zone or chamber 40 which contains or accommodates material adapted to be engaged by blast from the burner chamber or other means to form or convert the material into discrete bodies.

The casing 35 is provided with a tube 42 providing a passage or inlet through which fiber-forming or other heat softenable material from a supply feeder or forehearth (not shown) may be introduced into the chamber 40. Valve means (not shown) may be associated with the tube 42 for controlling or regulating the rate of ingress of material into the chamber 40.

The casing 35 is formed with an inwardly extending portion 44 which is configurated to form an orifice or passage 46 through which the gases of the blast and material entrained thereby are projected.

The configuration of the portion 44 defining the passage is such as to provide a restricted throat or choke band 48, the portion 44 being joined with outwardly flared wall portions 50 which together form a Venturi-like passage or configuration, the material and gases of the blast moving at high velocities in the throat 46.

The casing may be formed with a wall portion 52 which, with the portions 44 and 50 provide a chamber 54 adapted to accommodate a cooling fluid or medium to prevent overheating of the walls defining the Venturi-shaped passage. The casing 35 is formed with an inwardly extending portion 56 which terminates in a projecting portion 58 which defines a restricted orifice or passage 60 in direct communication with the passage 14 in the forward wall of the combustion chamber 12. In the embodiment illustrated, the orifice 60 is of comparatively small cross-sectional area as compared with the cross-sectional area of the chamber 12 so that the gases are discharged from the chamber at high velocities.

The region adjacent the path of the gases through the chamber 40 may be provided with one or more annular baffles or vanes 62 supported in any suitable manner and defining longitudinally spaced annular regions or passages through which the material 64 may flow into the path of the gases of the blast. The number and size of the vanes or baffles 62 may be varied depending upon the size of the chamber 40 and the character of the discrete bodies to be formed from the heat-softened material 64.

In the operation of the arrangement shown in FIGURE 1, a combustible mixture is delivered from the manifold 20 through the perforated wall 18 into the internal chamber 12 in which the mixture is ignited. The refractory walls of the chamber 12 become heated to incandescence and the burning gases in the chamber are reflected and refracted by the intensely hot walls whereby the gases undergo great expansion and are discharged through the passage 14 and orifice 60 as a high velocity, intensely hot gaseous blast.

Heat-softened material such as molten glass, slag or rock is delivered from a feeder or forehearth, in which the material is reduced to a molten or flowable state, through the inlet or passage 42 to substantially fill the chamber 40. The pressure and velocity of the gases of the blast cause them to be projected through the material in the central region of the chamber or confined zone 40, the moving gases entraining the material and conveying the same through the restricted orifice 46 and concomitantly converting, disintegrating or attenuating the entrained material into discrete bodies or fibers.

The gases of the blast move through the central region defined by the inner circular surfaces of the baffles or vanes 62 and the velocity of the moving gases effects the inspiration or induction of the material in the chamber 40 into the blast within the chamber so that the material is conveyed by the blast through the restricted region 46. The inertia of the viscous molten material tends to retard the rate at which the material is conveyed by the gases so that attenuating or drawing forces are exerted by the high velocity gases on the viscous material to form the material into elongated discrete bodies or fibers.

As will be noted in FIGURE 1, the inner circular surfaces of the baffles or vanes 62 are of progressively increased diameters in a direction toward the passage 46 so that the progressive inspiration of glass into the blast may be effected without appreciably affecting or retarding the velocity of the gases.

It has been found that the shape of the baffles or vanes 62 may be modified to vary the character of engagement of the moving gases with the material whereby the material may be formed into discrete bodies of various shapes. Thus the method and apparatus may be utilized to form bodies of other configurations than fibers, but the arrangement is especially adaptable to form glass or similar material into comparatively fine fibers which may be collected out of the gases of the blast upon a foraminous surface or by other known conventional means.

FIGURE 3 is illustrative of a modified form of the material receiving chamber or reservoir 40' wherein the main or attenuating blast may be supplemented by additional gas streams or blasts to facilitate the formation of the material into long fibers by increasing the effective range or length of the attenuating or fiber-forming region. The chamber 40' is surrounded by a wall 35' which terminates in an inwardly extending portion 44' and a flaring wall portion 50' defining the restricted orifice or passage 46'. The interior of the chamber 40' may likewise be provided with one or more annularly shaped baffles or vanes 62'.

Surrounding the wall portions 44' and 50' is a burner 70 formed with an annular combustion chamber or confined zone 72. The chamber 72 is adapted to burn a combustible mixture introduced into the chamber through a perforated wall 74 from manifolds or mixture supply pipes 76, the mixture being substantially completely burned within annular chamber 72. The walls defining the chamber 70 are configured to form an annularly-shaped restricted orifice 78 which surrounds the exit region of the passage 46'.

The gases from the combustion chamber 72 are projected through the restricted orifice 78 as a high velocity blast and the inner and outer wall portions 79 and 80 defining the orifice 78 are disposed in angular relation with respect to the axis of the main blast which moves through the orifice 46'. The annular blast from the orifice 78 supplements or augments the gases of the main blast to perform several functions. The supplemental blast embraces or surrounds the main blast and supplies additional heat to the main blast maintaining material being attenuated in a plastic or attenuating condition for an increased distance forwardly of the apparatus whereby the material may be drawn into fibers of greater length. The supplemental blast also functions as an added confining means for the blast and material entrained thereby to retard rapid expansion of the gases of the main blast whereby the high velocity of the gases of the main blast is maintained for a greater distance from the apparatus.

Under certain conditions of operation there may be a tendency for the material or glass to flow along the interior surface of the passage wall 50' during the progressive expansion of the gases forwardly of the restricted passage 46' and are discharged from the lip region of the nozzle. When this occurs, the supplemental blast entrains any material that may be discharged from the lip of the wall 50' and directs the same into the main blast for attenuation to fibers.

While the blast or blasts utilized for converting or disintegrating the material into discrete bodies is preferably of a high temperature above the attenuating temperature of the material, it is to be understood that blasts of steam, compressed air or the like may be utilized where the material to be acted upon by the blast is maintained in a highly heated or flowable condition suitable to facilitate attenuation or disintegration of the material by the blast or blasts.

The apparatus may be provided with means disposed in the path of the blast and entrained material to provide impediments or static means from which the molten material may be drawn by the blast into fibers. One form of such means is illustrated in FIGURES 4 and 5. The arrangement shown in these figures is illustrated in conjunction with a blowing tip or orifice construction of the character shown in FIGURE 1, but it is to be understood that the means may be used with other configuration of blower tip or nozzle without departing from the spirit of the invention.

A wall 52" of a casing or housing member 35" is formed with a laterally extending flange 80 which supports a material retarding or impeding means 82 in the form of an open mesh screen or a reticulated formation which is held in place by means of a clamping ring 84. In the operation of an apparatus equipped with a material retarding means 82, the viscous material entrained in the blast is impinged against the crossed wires of the means 82.

The gases of the blast move through the apertures or interstices provided by the mesh material and draw the material which is anchored to the wires or rods of means 82 through the apertures to form fibers of more uniform character than those which may be attenuated from apparatus without the use of a material impeding means.

The cross members of the mesh 82 interrupt the forward movement of the material and provide anchors or zones from which the material may be drawn by the gases of the blast in much the same fashion as an elastic member may be drawn into a thin elongated body by anchoring the body at a fixed point.

While the material interrupting medium 82 is illustrated as an open mesh screen which may be formed of platinum alloy, it is to be understood that other configurations of material interrupting media may be used such as rods, bars or blades arranged in substantial parallelism or grating or members formed with a plurality of small openings or means formed with grooves may be utilized for the purpose.

FIGURES 6 and 7 illustrate a form of apparatus for carrying out the method wherein the heat-softened material to be acted upon by the blast is delivered into a confined region or zone in spaced, generally radial directions whereby the gases of the blast inspire or induce flow of the material into the blast. The arrangement includes a burner 90 formed with a restricted passage 91 through which the hot gases from a combustion chamber are discharged as a high velocity blast.

Secured to a forward or nose portion of the burner is a casing or housing 93 which defines an annular chamber 94 adapted to receive molten or flowable material 95 through an inlet passage or duct 96. The casing or housing 93 is fashioned with an inner wall 98 aligned with the wall of the burner defining the restricted orifice 91 forming a continuation of the burner orifice. A hollow or tubular member 99 is aligned with the wall 98 to form a further extension of the confined zone or chamber through which the gases of the blast and material entrained therein are projected.

The inner wall 98 of the casing 93 is equipped with a plurality of radially arranged tubes or ducts 100 which are in communication with a chamber 94, the ducts 100 terminating at zones adjacent the central region of the confined zones or chamber 102 formed by the wall 98 and the hollow member 99.

Disposed centrally of the area defined by the wall 98 is a sleeve, baffle or guide member 104 located rearwardly of the exits or outlets of the tubes 100. The sleeve member 104 may be formed with an outwardly extending baffle portion or flange 106 for guiding the gases in a manner to assist in stabilizing the central and outer regions of the gases of the blast.

The baffle 106 provides an annular obstruction which reduces the cross-sectional area of the region bounded or defined by the wall 98 whereby the velocity of the gases moving adjacent the outlets of the tubes 100 is increased to augment the inductive or inspirative effect of the moving gases upon the molten material in the tubes 100 to facilitate the delivery of the material into the blast.

The sleeve 104 and baffle flange 106 divides the gas stream from the burner 90 into a central cylindrical configuration determined by the interior diameter of the sleeve 104 and an annular gas stream or blast defined by the wall 98 and the periphery of the baffle 106.

By forming the blast into concentric components, the central blast is the major force effective to induce or inspire the flow of molten material from the ducts or tubes 100 into the blast to be engaged and conveyed along by the blast, while the annular blast surrounding the central blast functions to prevent substantial or rapid expansion of the central blast, which effectively extends the attenuating range of the blast, and the inwardly acting pressure of the annular blast tends to hold or maintain the molten material in the central blast projected through the sleeve 104.

In the operation of the arrangement shown in FIGURES 6 and 7, a molten or flowable material of a character adapted to be attenuated or finally divided by engagement with a high velocity blast is delivered from a supply through the tube 95 into the annular chamber 94.

The material in the chamber 94 flows through the tubes or ducts 100 into the confined region provided by the wall 98 and member 99. The high velocity gas streams or blasts of gases moving through the sleeve 104 and through the annular passage defined by the wall 98 and flange 106 induce or inspire flow or delivery of the material from the ducts 100 into the blasts or gas streams. The material is entrained by the gas streams and drawn into fibers or discrete bodies of other shapes depending upon the character of engagement of the material with the blasts, the extent that the gases are confined, and the cross sectional configuration and velocities of the blasts.

FIGURES 8 through 13 illustrate a form of the invention especially usable for forming fine fibers from molten glass although the arrangement may be used with other heat-softenable fiber-forming materials. This form of apparatus is inclusive of a burner casing 110 formed of metal which is lined interiorly with refractory 112 defining a confined zone or combustion chamber 114. The nose portion of the burner is formed with a restricted orifice or discharge opening 116 through which gases under pressure in the chamber 114 are discharged at high velocities through the restricted orifice 116.

Disposed adjacent the nose portion of the burner 110 is a member 118 which defines a polygonally shaped reservoir or chamber 120 for the heat-softened material. The orifice 116, in the embodiment illustrated, is elongated transversely as particularly shown in FIGURES 9 and 12. The chamber 120 is provided with a pipe or tube 122 which is in communication with a source of supply of molten or flowable material such as a heated feeder or a forehearth adapted to contain the material.

The tube 122 directs the material from the supply into the chamber 120. The member 118 is formed with an interior wall structure 124 of substantially rectangular shape through which the gases from the chamber 114 are projected, the entrance of the passage 126 through the member 118 being in registration with the restricted orifice or outlet 116 of the burner. The casing 118 is formed with a forwardly projecting portion 130 of substantially rectangular cross-section having forwardly flaring or tapered walls as particularly shown in FIGURE 8 through which flow the gases from the chamber 114.

The inner wall 124, which defines the confined zone or gas passage 126, is formed with a plurality of openings 134 through which the molten or flowable material in chamber 120 may be delivered into the gas stream or high velocity gaseous blast moving through the orifice 116 and through the hollow interior regions of members 124 and 130.

In the operation of this form of construction, the gases from chamber 114, which are at temperatures of upwards of 3000° F. or more, are delivered at high velocities through the orifice 116 and through the confined region or zone 126. The moving gases inspire or induce the flow of material from chamber 120 through the openings 134 into the high velocity gas streams whereby the material is entrained and conveyed along by the gases and drawn or attenuated into elongated bodies or fibers.

The interior opposed surfaces of the projecting member or sleeve portion 130 are configurated with grooves 138 which are tapered with the maximum width of taper being adjacent the edge or lip 140 of the member 130 FIGURE 10 illustrates the arrangement of the channels or grooves 138, their greatest depth being at the forward edge wall or lip 140.

As shown in FIGURES 9 and 12, the serrations or grooves 138 are disposed in opposed walls of the member 130. The grooves tend to form the material adjacent the inner walls of portion 130 into individual streams of the material to facilitate better distribution of the material transversely of the upper and lower walls to attain more uniform attenuation of the material.

As shown in FIGURES 8, 9 and 13, supplemental burners 145 and 146 are disposed respectively above and below the portion 130 of the blast confining means. The burners 145 and 146 are formed with confined zones or combustion chambers 148 which receive combustible mixture from a supply manifold 150, the gases being ignited and substantially completely burned within the chambers 148. The walls of the chambers adjacent the member 130 are shaped to form an elongated restricted orifice 154 in the burner 145, and a similar orifice 156 in the burner 146.

The walls defining the orifices are angularly arranged so as to project or direct the intensely hot products of combustion or gases from chambers 148 toward the gaseous blast delivered from the hollow member 130.

The blast from the chamber 148 impinges the upper and lower boundaries of the main attenuating blast from the burner 110 to augment the heat of the blast, to increase the effective length of the attenuation or fiber-forming region and to prevent chilling or temperature reduction as well as substantial expansion of the gases of the main blast.

Through the provision of the grooves 138, the glass or material collecting therein is carried along by the cooperation of the gases of both the main blast and the supplemental blasts to attain uniform distribution of the material and to provide for efficient attenuation.

The arrangement shown in FIGURES 8 through 13 includes means for maintaining the components of the construction within safe operating temperatures. As shown in FIGURES 12 and 13 a tubular member 160 which is preferably of U-shaped formation providing parallel legs 161 and 162 flattened to the cross-sectional configuration indicated in FIGURE 13. Water or other coolant is circulated through the tubular member 160 adjacent the housing 118 containing the molten glass or other heat-softened material, the member 160 being connected with a supply of water or other coolant. The flattened portions 161 and 162 may be welded to the wall of the casing 118.

A means is also provided for effectively cooling and controlling the temperature of the member 130. The cooling means includes tubular members 165 and 166, the central portions of which are flattened at 167 and 168, the flattened portions being welded to or disposed in heat-transferring relation with the walls of the hollow member 130 to maintain the member 130 at a safe operating temperature below the fusing point of the metal.

The tubes 165 and 166 are connected with a source of water or other coolant for conveying heat away from the member 130. The casing 118 may be secured to the burner 110 by means of screws 170 passing through ears 171 formed on the casing 118 and threaded into openings in boss portions 173 formed on the burner housing.

FIGURES 14 and 15 illustrate another form of apparatus for carrying out the method of the invention. In this form the burner 10a is associated with a housing or member 180 which is fashioned with a interior chamber 182 defined by walls 183. An inner wall 184 defines a restricted passage 186 which is in registration with a restricted orifice 188 formed in an entrance portion of the casing 180. The casing 180 may be provided with a refractory lining 190 having a portion configurated to define the restricted orifice 188. The chamber 182, in which is maintained a supply of heat-softened material, surrounds the restricted passage or confined zone 186.

Associated with the wall 184 is a forwardly extending outwardly flaring or tapered member or portion 192 having an end region 194 formed with a plurality of grooves 196 defined by ridges or vanes 198. In the embodiment illustrated, the cross-sectional configuration of the orifice 188, passage 186 and the member 192 is circular, but it is to be understood that these passages may be of transversely elongated configuration or other shape if desired.

The wall portion 184, defining an inner wall of the glass receiving chamber 182, is formed with peripherally spaced openings or orifices 200 through which the material from chamber 182 may be delivered into the gas stream moving through the passage 186. The high velocity of the gas stream from the burner 10a forming the blast is effective at the openings 200 to induce, draw or inspire the flow of material from the supply chamber 182 into the passage 186 where it is entrained and attenuated to fibers by the moving gases.

The arrangement shown in FIGURES 14 and 15 includes a supplemental annular burner 204 surrounding the flares member 192 providing an annular combustion chamber 206 which receives combustible mixture through one or more supply pipes 208, the mixture being substantially completely burned within the chamber 206. The nose portion of the annular burner 204 is formed with a restricted orifice 210 of annular shape disposed adjacent and surrounding the terminous or lip of the flared member 192.

The annular walls defining the restricted orifice 210 are angularly disposed so as to direct a supplemental or auxiliary blast of intensely hot gases from the supplemental burner chamber 206 into impinging relation with the main gaseous blast delivered through the member 192 from the burner 10a.

In the operation of the apparatus shown in FIGURES 14 and 15, the intensely hot, high velocity gases moving through the confined zone 186 inspire or induce the flow of heat-softened material, such as glass, from chamber 182 into the moving gases, the velocity of the gases attenuating the material to fibers as the gases move from the confined zone 186 in a right-hand direction as viewed in FIGURE 14.

During the operation, some of the fiber-forming material is caused to flow along the wall of member 192 and this material flowing along the grooves 194 at the forward end of the flared member 192 is subdivided into small streams which are acted upon by both the main and supplemental blasts delivered from the burner chambers.

Through this arrangement, substantially complete attenuation of material to fibers is attained with a minimum of unfiberized material in the end product. Furthermore, by confining the main blast by wall 184, member 192 and the annular supplemental blast from the annular orifice 210, the linear range or region of attenuation is increased, a condition which fosters the formation or production of longer and finer fibers.

FIGURE 16 illustrates another modification of the apparatus for performing the method of the invention. The burner includes a casing 10b which is lined with refractory 112b providing a combustion chamber 114b, the refractory at the nose or forward portion of the burner being shaped to provide a restricted orifice or outlet 116b.

Disposed at the nose end of the burner and secured thereto is an auxiliary burner 220 which is formed with an inlet 222 through which a combustible mixture may be introduced into the chamber 224 defined by the burner casing 225 and adapted to be ignited and burned within the confined zone provided by the chamber 224. If desired, other gases under pressure may be introduced into the chamber 224 through the inlet 222 in lieu of the ignition and burning of a combustible mixture in the chamber to provide an auxiliary blast.

Disposed within the casing 225 and in contiguous relation with the nose end of the burner 10b is a substantially annular casing 228 provided with an inner wall 230 defining a restricted passage 246. The casing 228 forms a supply reservoir or chamber 232 adapted to contain molten glass or other heat-softenable material from a feeder or forehearth delivered into the chamber 232 through an inlet tube 234.

Extending forwardly of the casing 228 is a porous plate 236 preferably of annular cross section and fashioned of platinum rhodium or other material capable of withstanding the very high temperatures existent in the chamber 224. The forward portions or distal end region of the plate 236 are converged or arranged in converging relation as indicated at 238.

The forward wall 240 of the burner casing 225 is disposed in an angular position relative to the axis of the burner chamber 114b, and with the converging portions 238 of member 236, form an annularly shaped restricted discharge orifice or outlet 244 through which hot gases from the chamber 224 are discharged as an auxiliary or supplemental annular blast.

The passage or chamber 246, in alignment with the restricted orifice 116b formed in the nose of the burner 10b, forms a confined zone for the blast as the gases thereof move through the passage 246 and through the region defined or bounded by the member 236. The casing 228 is formed with divergently arranged walls 248 which connect the inner wall 230 with the member 236. The angularly arranged walls 248 are formed with a plurality of spaced openings 250 establishing communication between the material containing reservoir 232 and the confined zone or region provided by the passages or chambers 237 and 246.

The products of combustion or burned gases resulting from combustion of a mixture in the main burner chamber 114b are projected through the orifice 116b and passages or chambers 246 and 237 as an intensely hot high velocity blast of gases at temperatures of 3000° F. or more. The gases of the blast travelling in a right-hand direction as viewed in FIGURE 16, inspire or induce the flow of molten glass or other heat-softened material in the reservoir 232 through the openings 250, the material being entrained and conveyed along by the high velocity gases and attenuated thereby to fibers.

The heat of the main blast is augmented by the hot gases of the supplemental blast discharged through the annular orifice 244, the gases of which blend or join with the gases of the main blast to increase the length of the attenuating region or zone in which the fibers are attenuated.

Some of the glass moving through the openings 250 at the boundary of the blast tends to cling or adhere to the interior surface of the member 236. Hence it is desirable that the member 236 be fashioned or formed of a porous material whereby some of the heated gases from the chamber 224 flows through the pores in the member 236 to purge the inner surface of glass or other molten material which may adhere thereto and thus promote the distribution of such glass toward the core of the main blast moving through the member 236. Through this arrangement substantially all of the glass or other material delivered into the blast is attenuated to fibers with a minimum of slugs or unfiberized material in the end product.

The fibers entrained in the blast may be collected upon a foraminous conveyor in a conventional manner. While the chamber 246 defined by the inner wall 230 and the passage or chamber 237 defined by the member 236 are preferably of annular cross section, it is to be understood that the passage for the blast from the burner chamber 114b may be of transversely elongated rectangular shape or other configuration in cross section without departing from the spirit or the scope of the invention.

A further form of apparatus of the invention is illustrated in FIGURES 17 and 18 for carrying out the method of the invention. This arrangement includes the burner casing 110c lined with refractory 112c defining a confined zone or internal combustion chamber 114c. The inner walls of the refractory 112c are fashioned at the nose end of the burner providing a restricted orifice or outlet 116c.

Intensely hot gases or products of combustion resulting from burning of combustible mixture in the chamber 114c are projected through the restricted orifice 116c as an intensely hot, high velocity gas stream or blast. Disposed at the nose end of the burner 110c and in contiguous relation therewith is a hollow casing or housing 260 provided with an inner wall portion 262 which defines a central passage or chamber 264 in registration with the orifice 116c and through which the moving gases are projected.

The orifice 116c and the passage 264 are of generally rectangular configuration elongated in a transverse direction. The casing 260 defines a chamber or reservoir 265 adapted to receive and contain molten glass or other heat-softened material from a supply such as a feeder or forehearth delivered into the reservoir by means of a tube or pipe 267.

Extending forwardly of the casing 260 is a hollow or tubular member 270 defining a passage or chamber 272 which is in communication with the passage or chamber 264. The inner wall 262 of the casing 260 and the rear end of the hollow member 270 are joined by angularly disposed wall portions 266 which are provided with spaced perforations or orifices 267 through which glass or molten material from the chamber 265 may flow into the chamber 272.

The high velocity gas stream or blast of gases moving through the chambers 264 and 272 induce or inspire the flow of glass or material through the orifices 267, the material being entrained and conveyed by the moving gas stream in a right-hand direction as viewed in FIGURE 17, the velocity of the gases attenuating or converting the heat-softened material to fibers or discrete bodies.

In this form of the invention a burner 276 is provided for supplying an auxiliary annular gaseous blast surrounding the main blast, the gases of the annular blast engaging and joining the main blast at the distal end of the member 270. The auxiliary burner 276 is provided with a casing 277 equipped with an inlet (not shown) through which a combustible mixture may be introduced into the chamber 278 defined by the casing 277 in which the mixture is burned and the burned gases projected through a restricted orifice 280 surrounding the distal end region 274 of the member 270.

The end portion 274 of member 270 and a forward wall portion 279 of the burner casing 277 are arranged in angular convergent relation providing a restricted orifice 280 through which the intensely hot exhaust gases or products of combustion from the chamber 278 are discharged as a supplemental blast impinging upon, engaging or joining the gases of the main blast from the burner chamber 114c.

As the velocity of the moving gas stream providing the main blast is greatest at the central region of the chamber 272, there is a tendency for some of the glass or molten material in the chamber 272 to collect as a film along the inner wall of the member 270. This form of apparatus includes a means for removing the glass or material that may adhere to the member 270 by directing gases of the blast into contact with material on the inner surface of member 270 to entrain and attenuate such material into fibers and thereby reduce the formation of slugs or unfiberized material.

Disposed within the distal end region of member 270 is a member or baffle 282 supported in any suitable manner, the major wall portions of which are in converging relation as shown in FIGURE 17. The wall portions 274 of member 270 are also angularly disposed and in a slightly convergent relation with the forward wall portions of member 282 providing a restricted orifice 287 surrounding a chamber or central passage 285 defined by the member 282.

The rearmost portions of member 282 are formed with angularly arranged convergent portions 284 providing a baffle means or guide for directing some of the gases of the moving gas stream toward the inner wall of member 270 and through the orifice 287. As the glass along the inner wall of member 270 is delivered from the orifice 287, the high velocity gases from orifices 280 and 285 engage and entrain such material which is carried along and attenuated to fibers by the velocity of the moving gases.

Furthermore the baffle member 282 provides a restricted passage or chamber 285 so that the gases of the main blast move through the passage 285 at high velocities. The supplemental blast from the orifice 280 supplies additional heat to the main blast to increase the attenuating range and confine the gases of the main blast preventing rapid expansion thereof with a consequent maintenance of high velocity of the gases of the main blast for a greater distance from their source.

FIGURES 19 and 20 illustrate a modified form of a portion of the construction illustrated in FIGURES 17 and 18. In this form, the member 290 corresponds with the member 270 shown in FIGURE 17, the member 290 defining a passage 292 through which flow the high velocity gases of the main blast. An auxiliary burner construction 294 surrounds the forward region of the member 290 and is provided with a combustion chamber 295 adapted to burn a combustible mixture.

The burned gases or products of combustion are discharged through a restricted orifice 297, the gases of the supplemental blast, moving in the general direction of the gases of the main blast, join with those of the main blast in the same manner as described in connection with the construction shown in FIGURES 17 and 18. The extreme end portions 299 of the member 290 are angularly arranged in converging relation as shown in FIGURE 19.

The interior walls of the member 290 at the distal end region thereof are formed with spaced, generally parallel ridges or vanes 300 provides channels, recesses or grooves 302 through which flow some of the gases of the main blast engaging the glass or other material collecting on the interior of the wall of member 290 and attenuating the same to fibers. By forming the channels 302, the glass or other material is sub-divided into a plurality of small streams which are readily attenuated by the gases of the blast to fibers effecting a reduction or elimination of unfiberized material.

The arrangement shown in FIGURE 21 involves the utilization of a heating means effective adjacent the reservoir containing the molten glass or other material, to control the viscosity of the glass in the reservoir or supply under certain operating conditions. For example, glass of a high fusing temperature may be utilized for forming fibers and a control of the temperature of the glass in the reservoir is essential to maintain the glass in a proper flowable condition especially where the gases from the combustion chamber may be of a reduced temperature or where gases such as steam or compressed air may be employed as attenuating mediums.

While any heating medium may be employed, it has been found that an electrically energized heating means may be advantageously employed for the purpose. As shown in FIGURE 21, gases from the combustion chamber 114d in the burner 110d are delivered through a restricted orifice 116d, the gases flowing through passages 305 and 307. The passage 305 is defined by an interior wall 308 of a casing 309 forming a reservoir 310 which receives molten glass or other material from a main supply through an inlet tube 312. The passage 307 is defined by a tubular member 314.

The portion of the casing 309 adjacent the end of member 314 is formed with angularly disposed walls 316 provided with openings 317 through which glass or molten material from the chamber 310 is delivered into the confined zone or region provided by the passages or chambers 305 and 307 under the influence of the high velocity gas stream or blast moving through the chambers which inspires or induces the glass to flow from the reservoir 310 through the openings 317 into engagement with the gases of the blast which attenuate the material to fibers.

The forward portion of the member 314 may be surrounded by an auxiliary burner 320 provided with a combustion chamber or confined zone 321 from which burned gases are projected through a restricted orifice 323 as an auxiliary blast surrounding the main blast and joining the same in a manner hereinbefore described in connection with the form of the invention shown in FIGURES 17 and 18.

In the arrangement illustrated in FIGURE 21, the heating means for the material containing reservoir 310 is inclusive of one or more induction coils 325 surrounding the reservoir 310 defined by the casing 309. An electric current flowing through the coils 325 heats the material in the reservoir 310 by induction. By regulating the electrical energy or current flow through the coils 325, an effective control of the temperature of the material in the reservoir 310 may be maintained.

Through the controlled heating means, the viscosity of the glass or other material may be maintained within proper limits or within a proper range to facilitate the continuity of flow of the material through the openings 317 and into the blast.

An additional heating means may be provided for the hollow or tubular member 314 and as illustrated, such means is in the form of an induction coil 330 surrounding the member 314 at a region between the casing 309 and the auxiliary burner 320. By flowing electric current through the induction coil 330, the glass or molten material in contact with the inner wall of member 314 will be heated to maintain the material in flowable condition so that it may be entrained and attenuated to fibers by the gases of the main blast moving through the chamber 307.

FIGURE 22 is illustrative of an arrangement wherein the heating means for controlling or regulating the temperature and hence viscosity of the material to be acted upon by the blast is of the capacitance type provided by capacitor plates. In the arrangement shown in FIGURE 22 the burner 110e, gas discharge orifice 116e, casing 309e forming the reservoir 310e, the hollow member 314e and the auxiliary burner 320e are of the same construction as illustrated in FIGURE 21 and hereinbefore described.

Surrounding the periphery of the casing 309e is a capacitor plate and surrounding the tubular or hollow member 314e is a second capacitor plate 342. The plates 340 and 342 are connected to a supply of electric current or electric energy through leads or conductors 343 and 344 respectively. The glass or other heat-softenable material in the reservoir 310e, the casing walls and the wall of member 314e are thus heated by capacitance.

The metal components 309e, the inner wall 308e defining the chamber 305e and member 314e are made of metals such as platinum rhodium, platinum iridium or other alloys capable of withstanding the high temperatures established to maintain the glass or other fiber-forming material in a proper flowable or attenuable condition. The current established between the capacitor plates flows through the glass or other material in the chamber 310 to heat the same and any glass that collects on the interior of the wall 314e is heated by conductance.

By regulating or varying the energy flow between the capacitor plates where high current is used, or where the heating is effected by high frequency, the frequency may be varied, an effective control of the viscosity of the material may be maintained.

The blast of gases from the burner moving through the chambers or passages 305e and 307e inspire the flow of the heated glass or other material from the reservoir through the openings 317e into the blast which is attenuated to fibers, the supplemental blast from the restricted orifice 323e serving to lengthen the effective attenuating range, to confine the main blast and augment the heat of the main blast.

FIGURES 23 and 24 are illustrative of the apparatus shown in FIGURE 21 in combination with another form of means for heating the glass or material to be converted into discrete bodies or fibers. The casing 309f positioned adjacent the blast producing burner 110f is provided with a terminal 350 and the metal inlet tube 312f is provided with a second terminal 352. The terminals 350 and 352 are connected with a source of electric current or energy. By flowing a comparatively large amount of current through the casing 309f and through the glass contained in the chamber or reservoir 310f, the temperature of the glass and hence its viscosity may be regulated and controlled.

The hollow member 314f projecting forwardly of the reservoir casing 309f may be provided with oppositely disposed terminals 356 and 358 and current may be supplied to the terminals which flows through the metal of the member 314f maintaining the same in heated condition so as to maintain glass indicated at 359 on the inner wall of member 314f in a flowable condition so that it may be entrained in the gaseous blast moving through the central region or chambers 305f and 307f. By maintaining the glass or fiber-forming material at the proper viscosity, the tendency for the material to be formed into slugs is greatly reduced or eliminated.

An inductance coil 360 disposed in a position surrounding the member 314f may be used in conjunction with the current flow through the member by current connected with the terminals 356 and 358, or in lieu of direct heating through the terminals.

The method of blast attenuation disclosed converts or attenuates the material to fibers of varying lengths and certain difficulties in attenuating molten glass to exremely long or subsantially continuous fibers or filaments by blast attenuation are due to surface tension of the glass which tends to draw the fibers into beads. The arrangement shown in FIGURE 23 embodies a means for reducing or substantially eliminating surface tension in the material during attenuation resulting in the formation of long fibers. This is accomplished by establishing an electrostatic field in the vicinity or region of the attenuating zone which apparently relieves or greatly reduces the surface tension in the fiber-forming material.

As shown in FIGURES 23 and 24, bars or electrodes 362 and 363 are arranged on opposite sides of the blast adjacent the attenuating region forwardly of the hollow member 314f. The distal end of the sleeve or member 314f is formed with serrated surfaces 365 providing linear groups of spaced teeth or projections 367 which form anchor points or nubs from which the glass in engagement therewith may be drawn by the gases of the blast into fibers or filaments. An electric current of high potential, for example upwards of ten thousand volts or more, establishes an electrostatic field which is effective to reduce surface tension in the material being drawn from the anchor points 365 into fibers by the moving gases of the blast.

FIGURE 25 illustrates another form of apparatus for removing glass or material which may collect upon the means confining the blast so as to disperse the collected glass into the path of the gases of the attenuating blast. With reference to FIGURE 25, a blast confining member 375 is secured to the forward end or extremity of a blast conveying member 377 of hollow or tubular shape which conveys the gases of a high velocity blast from a burner and is in communication with a reservoir containing glass or other fiber-forming material of the general character shown in FIGURE 14.

The member 375 is formed with a flaring wall 379 defining a passage 380 through which flow the moving gases and fiber-forming material entrained therein. The member 375 is formed of a porous material such as high temperature refractory, the porosity being of a character facilitating the transfer of air or other gases through the pores to purge the surface 379 of glass collected thereon and to direct the glass into the moving gases so that it may be properly attenuated thereby.

Surrounding the member 375 is a jacket or casing 382 forming a manifold 384 connected by one or more tubes 385 with a source of gas under pressure such as compressed air. During attenuation, the gas or air pressure impressed in the manifold 384 causes the air therein to filter through the pores in the member 375 providing an air film at the surface 379 to prevent the collection of or to purge the surface of glass.

The film or layer of air on the surface 379 acts as a lubricant to deter the accumulation of glass on the surface. While compressed air may be used economically for the purpose, it is to be understood that a combustible mixture or an inert gas may be used in lieu of compressed air. If a reduction in the surface tension of the glass is desired, a gas such as sulphur dioxide may be used for the purpose. The shape of the surface 379 of the nozzle or member 375 may be varied dependent upon the extent that it is desired to confine the gases of the blast and thereby modify the rate of travel of the moving gases of the blast.

It is apparent that, within the scope of the invention, modifications and different arrangements may be made other than is herein disclosed, and the present disclosure is illustrative merely, the invention comprehending all variations thereof.

I claim:

1. Apparatus for forming fibers from heat-softenable mineral material in a molten state including, in combination, an elongated tubular chamber, means for delivering combustible gases into one end of the tubular chamber, the combustible gases adapted to be burned in the tubular chamber to provide a hot high velocity blast of gases of combustion, the gases of combustion providing the blast being projected through the other end of the tubular chamber, receptacle means adapted to contain heat-softened mineral material, a plurality of spaced baffles having openings therein disposed in the receptacle, the gases of the blast passing through openings in the baffles whereby the blast entrains the molten material adjacent the baffles and attenuates the entrained material to fibers by the velocity of the blast.

2. Apparatus for forming fibers from heat-softenable mineral material in a molten state including, in combination, an elongated tubular chamber, means for delivering combustible glases into the tubular chamber, a jacket surrounding the tubular chamber accommodating circulating cooling fluid, the combustible gases adapted to be burned in the tubular chamber to provide a hot high velocity blast of gases of combustion, the gases of the blast being projected through an open end of the tubular chamber, receptacle means adapted to contain heat-softened mineral material, a plurality of spaced baffles disposed in the receptacle, the gases of the blast passing through central openings formed in the baffles at velocities whereby the blast entrains the molten material adjacent the baffles and attenuatees the entrained material to fibers by the velocity of the gases of the blast.

3. Apparatus for forming fibers from heat-softenable mineral material in a flowable state including, in combination, an elongated tubular chamber, means for delivering combustible gases into one end region of the tubular chamber, the combustible gases adapted to be burned in the tubular chamber to provide a hot high velocity blast of gases of combustion, the gases of the blast being projected through an open end of the tubular chamber, receptacle means adjacent the tubular chamber adapted to contain heat-softened mineral material, a plurality of longitudinally spaced baffles having openings therein in said receptacle means, the gases of the blast passing through the openings in the baffles whereby the blast entrains the heat-softened flowable material adjacent the baffles and attenuates the entrained material to fibers by the velocity of the blast, and a tubular member embracing the blast and entrained material.

4. Apparatus for forming fibers from heat-softenable mineral material in a flowable state including, in combination, an elongated tubular chamber, means for delivering combustible gases into one end of the tubular chamber, a jacket surrounding the tubular chamber accommodating circulating cooling fluid, the combustible gases adapted to be burned in the tubular chamber to provide a hot high velocity blast of gases of combustion, the gases of the blast being projected through the other end of the tubular chamber, receptacle means adjacent the tubular chamber adapted to contain heat-softened mineral material in a flowable state, a plurality of spaced baffles in the receptacle formed with openings aligned with the axis of the blast, the gases of the blast passing through the openings in the baffles whereby the blast entrains the heat-softened flowable material adjacent the baffles and attenuates the entrained material to fibers by the velocity of the blast, a tubular member embracing the blast and entrained material, and a cooling jacket adjacent the tubular member accommodating a circulating cooling fluid.

References Cited by the Examiner
UNITED STATES PATENTS

| | | | |
|---|---|---|---|
| 2,333,218 | 11/1943 | Von Pazsiczky | 65—14 |
| 2,338,473 | 1/1944 | Von Pazsiczky | 65—14 |
| 2,460,085 | 1/1949 | Hess. | |
| 2,559,572 | 7/1951 | Stalego | 65—13 |
| 2,578,100 | 12/1951 | Stalego | 65—16 |
| 2,578,101 | 12/1951 | Stalego | 65—16 |
| 2,609,566 | 9/1952 | Slayter et al. | 65—14 |
| 2,925,620 | 2/1960 | Karlovitz et al. | 65—16 |
| 3,015,127 | 1/1962 | Stalego | 65—16 |

DONALL H. SYLVESTER, *Primary Examiner.*

MICHAEL V. BRINDISI, *Examiner.*